Patented June 17, 1924.

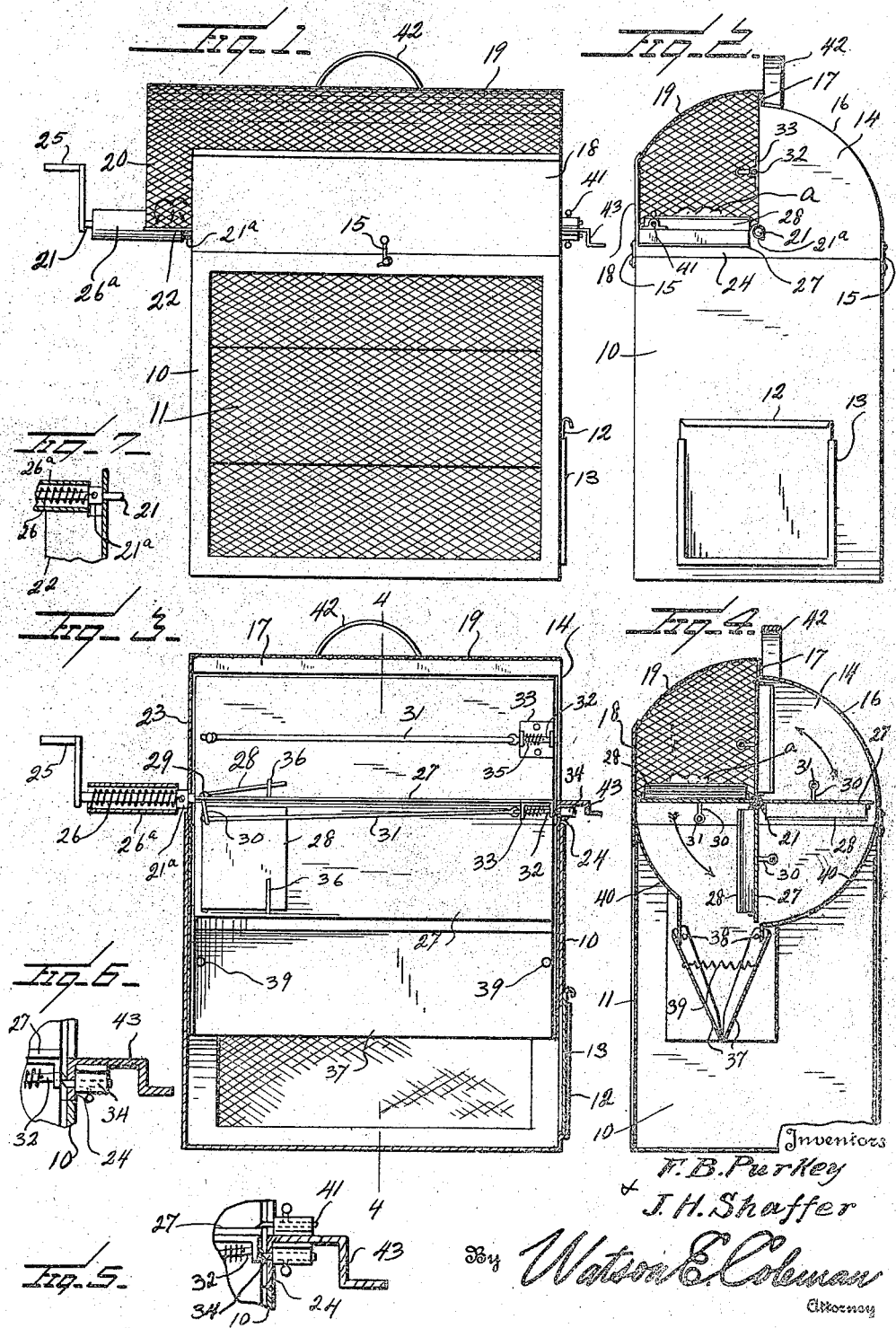

1,498,481

UNITED STATES PATENT OFFICE.

FRANK B. PURKEY AND JAMES H. SHAFFER, OF KINGSPORT, TENNESSEE.

RAT TRAP.

Application filed November 29, 1922. Serial No. 603,971.

*To all whom it may concern:*

Be it known that we, FRANK B. PURKEY and JAMES H. SHAFFER, citizens of the United States, residing at Kingsport, in the county of Sullivan and State of Tennessee, have invented certain new and useful Improvements in Rat Traps, of which the following is a specification, reference being had to the accompanying drawings.

This invention relates to traps, and particularly to that class of traps wherein a series of platforms are provided rotatable around a common axis, the trap being provided with means for holding a platform in proper position until a rat or other animal has trodden upon the platform, whereupon the series of platforms revolve one step to discharge the rat into the body of the trap.

The general object of our invention is to provide a simple and effective trap for this purpose embodying a housing having a series of platforms arranged for movement therein and mounted upon a common shaft, each of these platforms being provided with a bait supporting treadle and a latching device so that when the rat or other animal enters the housing to secure the bait he will step upon the treadle and this will release the latch and the trap will turn over one step and fling the rat into the lower portion of the trap.

A further object in this connection is to provide a hopper through which the rat is discharged into the body of the trap, this hopper having pivoted walls so as to prevent the egress of the rat from the body of the trap.

A still further object is to provide a trap of this character with a spring acting to rotate the shaft so as to cause a positive rotation of the shaft and a very rapid movement of a platform so as to discharge the rat suddenly into the collecting body of the trap.

Another object is to provide improved means for tensioning the spring from time to time.

Still another object is to provide means for holding the platforms in operative position for placing bait thereon.

A further object is to provide improved means for releasing the platforms to permit them to rotate under the action of the spring.

Other objects will appear in the course of the following description.

Our invention is illustrated in the accompanying drawings, wherein:—

Figure 1 is a front elevation of a trap constructed in accordance with our invention;

Figure 2 is an end elevation of the trap shown in Figure 1;

Figure 3 is a vertical sectional view thereof;

Figure 4 is a section on the line 4—4 of Figure 3;

Figure 5 is a fragmentary detail section through the means for holding the trap from actuation;

Figure 6 is a fragmentary sectional view through the end wall 24, showing the stop 34;

Figure 7 is a fragmentary sectional view of the winding spring housing.

Referring to these drawings, 10 designates a receiving body which constitutes a base for the trap and which is preferably made of sheet metal and on one face provided with a screen 11 occupying any desired portion of this wall or face of the body. One end of the body is preferably provided with a door 12 operating in guides 13 or otherwise mounted so that the rats or other trapped animals may be removed from the body.

Detachably mounted upon the side and end walls of the body is a housing 14. This housing may be latched to the rear wall of the body 10 and latched to the front wall of the body 10, as by the latches 15. Any other suitable means for detachably connecting the housing to the body 10 may be provided however. This body 10 has a length approximately the area of the upper end of the body 10 and the rear portion of the housing is formed of sheet metal, this rear wall 16 arching upward and forward to a point above the middle of the housing. The wall then extends upward, as at 17. The front wall 18 of the housing extends straight upward a certain distance and is connected to the wall 17 by means of an arcuate wall 19 of wire mesh or other suitable material. The top wall 19 of the housing, which is formed of wire mesh, is extended laterally beyond the front wall 18, as at 20, and extends downward to a level with the shaft 21 and is provided with a small platform or floor 22 upon which the bait *a* is disposed.

The shaft 21 extends longitudinally and concentrically to the wall 19 and is mounted in suitable bearings in the end walls 23 and 24. This shaft projects beyond the end wall 24 and is provided with a crank handle 25 at its extremity, and surrounding the shaft is a spring 26, one end of which is attached to the end wall and the other end of which is attached to the shaft. A housing 26ª extends over the spring. By rotating the crank handle 25 this spring may be wound up so as to be placed under any desired tension. The collars 21ª hold shaft 21 from longitudinal movement.

Mounted upon shaft 21 are a plurality of radially extending platforms 27, preferably four in number, the platforms being arranged at right angles to each other and being of such size as to fill the space between the shaft 21 and the walls 16 or 18, and having a length approximately equal to the distance between the walls 23 and 24. Each platform has mounted upon it at one end a trigger plate 28 which is pivoted at 29 and has an arm 30 extending downward through the platform. The lower end of this arm is connected by means of a rod 31 to a sliding latch 32 having the form of a bolt, and operating within a guide 33 and being adapted to engage a stop 34 carried on the end wall 23 and having the form of a spring projected bolt. A spring 35 acts to project this bolt-like latch 32. This spring, therefore, urges the trigger plate 28 upward against the stop 36 which is carried upon the platform. This trigger plate is disposed at that end of each platform adjacent the bait *a*.

The end wall 23 of the housing is formed with a suitable opening (or the opening may be made in the front wall if desired) so that a rat may enter this opening and rest upon the platform which happens to be in position. The rat in advancing toward the bait will tread upon the trigger plate or treadle 28 and the weight of the rat will depress this treadle, retracting the latch 32, whereupon the spring 26 will immediately cause the rotation of the shaft 21 and the platform upon which the rat is standing will move rapidly downward and cast the rat into the receiver 10.

In order that the rat may be prevented from getting out of the receiver or box 10, we provide a hopper formed with pivoted side walls 37, these walls being pivoted at their upper ends, as at 38, and being formed of thin sheet metal or like material suitably reinforced, the walls being urged toward each other and into downwardly convergent relation by means of a spring or springs 39. From the upper edges of this hopper extend the upwardly and forwardly and upwardly and rearwardly extending walls 40 which are approximately concentric to the shaft 21 and extend up to the front and rear walls of the housing. Thus a rat discharged from the platform lands upon the walls 37 of the hopper, passes between these walls, opening the walls against the action of the spring 39, and is discharged into the receiver 10. As one platform moves downward from its receiving position, the next adjacent platform moves into a horizontal receiving position, and the instant that the latch 32 reaches the stop 34, the spring 35 will project the latch, bringing the platform in a horizontal position in alignment with the floor 26, and the trap is again set.

In order to provide means for holding the platform from reverse rotation, we provide a spring projected bolt or latch 41 which is forced inward when one of the platforms moves into a horizontal position and is then projected over the upper face of the platform.

Preferably the housing is provided with a handle 42 whereby the trap may be carried from place to place, and in front of the opening in the end wall 24 of the trap is disposed a ledge 43. It will be noted that the bait platform 22 constitutes a support for the housing 26ª.

The operation of this device will be obvious from what has gone before. The rat enters at the open end of the housing and onto the platform which is in loading position. In approaching the bait, the rat must pass over the trigger plate 28, which releases the catch 32 upon the slightest pressure and permits the platform to drop. The rat falls into the cage or receiver 10 and the next platform is brought into loading position, the next adjacent platform pushing the rat down before it so that there is no possible chance for the rat to escape. This positive rotation is caused by the spring 26, and the action of the trap platforms revolving into place for loading and discharging is continuous until the spring is unwound. The rats are removed from the cage or body through the sliding door 12, and the hopper prevents the rats from climbing out of the cage.

We claim:—

1. A trap of the character described including a housing, a shaft extending longitudinally through the housing, a series of platforms mounted on the shaft for rotation therewith, the front of the housing at one end thereof being provided with a bait chamber with which each platform is adapted to successively align, means tending to rotate the shaft in a direction to carry the forward platform downward into the body, a trigger plate associated with each platform and disposed adjacent the bait chamber and having a downwardly extending arm, a bolt-like, spring-projected catch mounted upon the under face of and at the opposite end of each platform from the trigger plate, means connecting the spring-projected catch with the trigger plate for movement whereby to withdraw the latch upon a depression of the plate, a member with which said catch is adapted to engage when the catch is projected to hold the platform in line with the bait chamber, and a spring-projected bolt extending over the platform when in the last named position, said bolt having a beveled end permitting the passage of the platform and being manually retractible.

2. A trap of the character described including a housing, a shaft extending longitudinally through the housing, a series of platforms mounted on the shaft for rotation therewith, the front of the housing at one end thereof being provided with a bait chamber with which each platform is adapted to successively align, means tending to rotate the shaft in a direction to carry the forward platform downward into the body, a trigger plate associated with each platform and disposed adjacent the bait chamber and having a downwardly extending arm, a bolt-like, spring-projected catch mounted upon the under face of and at the opposite end of each platform from the trigger plate, a rod connected at one end to the catch and at its other end to the trigger plate, a spring-projected, bolt-like member mounted upon the end wall of the housing and projecting into the path of movement of the catch and acting to hold the platform in a position of alignment with the bait chamber, and a spring-projected, bolt-like member mounted upon the end wall above the first named bolt-like member and having its end disposed in the path of movement of the platform, this end being beveled to permit the passage of the bolt on the platform, the bolt-like member being manually retractible.

In testimony whereof we hereunto affix our signatures.

FRANK B. PURKEY.
JAMES H. SHAFFER.